United States Patent
Michielsens et al.

(10) Patent No.: US 7,058,714 B2
(45) Date of Patent: Jun. 6, 2006

(54) SPECIAL GATEWAY FOR MULTIMEDIA NETWORKS

(75) Inventors: Jan Michielsens, Zandhoven (BE); Jean Taeymans, Boechout (BE); Phil Cretch, Tervuren (BE)

(73) Assignee: Alcatel, Paris (FR)

( * ) Notice: Subject to any disclaimer, the term of this patent is extended or adjusted under 35 U.S.C. 154(b) by 746 days.

(21) Appl. No.: 09/939,691

(22) Filed: Aug. 28, 2001

(65) Prior Publication Data

US 2002/0026515 A1  Feb. 28, 2002

(30) Foreign Application Priority Data

Aug. 29, 2000 (EP) .................................. 00402379

(51) Int. Cl.
  G06F 15/173  (2006.01)
  G06F 15/16   (2006.01)
  H04L 12/28   (2006.01)

(52) U.S. Cl. ...................... 709/225; 709/227; 370/400; 370/389

(58) Field of Classification Search ................ 709/225, 709/226, 227, 231; 370/400, 401, 389; 713/200
See application file for complete search history.

(56) References Cited

U.S. PATENT DOCUMENTS

| 5,793,763 | A  | * | 8/1998  | Mayes et al. ............... 370/389 |
| 6,259,695 | B1 | * | 7/2001  | Ofek .......................... 370/389 |
| 6,381,459 | B1 | * | 4/2002  | Gervens et al. ............. 455/445 |
| 6,460,081 | B1 | * | 10/2002 | Doherty et al. ............. 709/225 |
| 6,480,898 | B1 | * | 11/2002 | Scott et al. ................. 709/238 |
| 6,496,704 | B1 | * | 12/2002 | Yuan .......................... 455/466 |
| 6,496,867 | B1 | * | 12/2002 | Beser et al. ................ 709/245 |
| 6,539,431 | B1 | * | 3/2003  | Sitaraman et al. .......... 709/226 |
| 6,574,469 | B1 | * | 6/2003  | Xiang et al. ................ 455/416 |
| 6,584,080 | B1 | * | 6/2003  | Ganz et al. ................. 370/315 |
| 6,631,416 | B1 | * | 10/2003 | Bendinelli et al. .......... 709/227 |
| 6,640,307 | B1 | * | 10/2003 | Viets et al. ................. 713/201 |
| 6,643,687 | B1 | * | 11/2003 | Dickie et al. ............... 709/206 |
| 6,707,799 | B1 | * | 3/2004  | Chui .......................... 370/282 |
| 6,865,613 | B1 | * | 3/2005  | Millet at al. ................. 709/245 |

OTHER PUBLICATIONS

M. Korpi et al, Supplementary Services in the H.323 IP Telephony Network, IEEE Communications Magazine, US, IEEE Service Center, Piscataway, NJ vol. 37, No. 7 Jul. 1999, pp. 118-125, XP000835313.

(Continued)

Primary Examiner—Ario Etienne
Assistant Examiner—El Hadji M. Sall
(74) Attorney, Agent, or Firm—Sughrue Mion, PLLC

(57) ABSTRACT

A communications network that includes an originating Real Time Data over IP host and a terminating Real Time Data over IP host between which communication is to be effected. The network also includes communication controller for receiving information relating to the communication. The network also includes a communication forwarder that receives at least some data sent between the two Real Time Data over IP hosts and which sends to the communication controller information relating to the communication.

15 Claims, 1 Drawing Sheet

OTHER PUBLICATIONS

S. W. Lodin et al, "Firewalls Fend Off Invasions from the Net", IEEE Spectrum, IEEE, Inc. New York, US, vol. 35, No. 2, Feb. 1, 1998, pp. 26-34, XP000768657.

G. A. Thom. H. 323: The Multimedia Communication Standard for Local Area Networks, IEEE Communications Magazine, US. IEEE Service Center, Piscataway,NJ vol. 34, No. 13, Dec. 1, 1996, pp. 52-56, XP000636454.

Patent Abstract for CN1209250 dated Feb. 24, 1999.

Patent Abstract for WO9914931 dated Mar. 25, 1999.

* cited by examiner

SPECIAL GATEWAY FOR MULTIMEDIA NETWORKS

BACKGROUND OF THE INVENTION

The present invention relates to a data network and to a method of communicating data over the network. Particularly, the invention relates to real time data over Internet Protocol such as Voice over Internet Protocol (VoIP) networks.

The architectural model of Internet telephony is rather different to that of the traditional telephone network. All signaling and media flows run over a "best effort" Internet Protocol (IP) based network (either the public Internet or various private intranets), and in appearance any device can communicate directly with any other.

Internet telephony can currently be used for free (or almost) between two (or more) Real Time Data over IP "hosts" (e.g., PC's gateways, etc.) using public IP-based networks (the Internet, e.g., through a dial up connection or not). However, the quality of the audio/video is highly dependent on the actual loading of the network.

In order to yield good quality, the audio/video media flows preferably has a short end-to-end latency. Such real time flows do not co-habit very well on the same IP-based network with various flows used for the transfer of data. Hence, ideally real time flows need to run on separate IP-based networks with little or a carefully controlled amount of data traffic.

The operator of such a separate Real Time Data over IP network will usually demand a compensation for the use of his infrastructure. The subscriber to the service may have to pay a fee for the duration, the distance and the type of session. Hence, the Real Time Data over IP network must accurately determine the status of each session, even in case of a failing host terminal or other abnormal situations, e.g., attempted fraud.

A Real Time Data over IP host can be any native IP device (e.g., H.323/SIP terminal), multimedia PC or ordinary telephone which sets up a session/call over the IP-network with another Real Time Data over IP host in order to make, e.g., a telephone call or a combination of a telephone call with data, i.e., a multimedia session.

A distinction can be made between an ordinary telephone, a H.323/SIP terminal (e.g., a native IP terminal), and a multimedia device (i.e., PC), as each may have a different type of connection to the network and support different types of services.

The telephone and multimedia devices are usually directly connected to a telephone exchange. These devices therefore usually have an indirect connection to the IP-network. A telephone, used for IP-telephony, is connected to a Media Gateway of its Internet Telephony Service provider (ITSP VoIP provider) via the telephone exchange. On the other hand, a multimedia PC interconnects via the telephone exchange and a remote access service (RAS) function of an internet service provider (ISP) to the network of the ITSP, usually using a dial-up (modem) connection. The possibility therefore exists to make a VoIP call, using suitable software, e.g., Netmeeting, Net2Phone, etc.

Native VoIP terminals are directly connected to the VoIP network, so that, for example, the H.323/SIP terminals support the encoding/decoding and packetization/sequencing of information (i.e. the Gateway Function) exchanged with other H.323 terminals.

In the prior art, a media gateway is used to connect two dissimilar networks, for example, a Public Switched Telephony Network (PSTN) and an IP network. This connectivity of dissimilar networks is achieved by translating protocols for call set-up and release, converting media formats between the different networks, and transferring information between the networks connected by the gateway.

In the prior art, a call server is used which is a device located in the data network, controlling and handling the voice over data streams from PSTN and data users to other PSTN and data users. The transport functions of the call server include interfaces to the data network for the transport of the voice streams. Signaling protocols interface with both the PSTN and data network.

Typical Real Time Data over IP connection procedures at present are described here below for some Voice over IP (VoIP) examples:

(1) Using a telephone: A telephone user dials into the Media Gateway of a VoIP provider. As explained earlier, voice will be transformed into VoIP packets and sent over the IP-network to a destination VoIP host.

(2) Using a multimedia PC: A PC dials into the RAS of an ISP provider. Via the ISP, the PC-user is able to set up a VoIP connection. This is possible with a direct connection to another VoIP host or via a VoIP provider.

(3) Using a native IP device: a VoIP host using protocols such as H.323 or SIP, initiates a session by requesting this to a Call Server which has a Gatekeeper function. The Gatekeeper maintains a list of subscribers and grants (or not) the permission to proceed—e.g., after the verification of the identity or the account of the subscriber. It also returns the current IP address of the destination. In the case that the called party is within the PSTN, the session will be directed to a PSTN/IP gateway, the latter playing the role of the terminating VoIP host. The VoIP hosts will then negotiate session set-up and capabilities with each other using elements of the above protocol. Since the gatekeeper needs to be informed at all times about the status of the session, the VoIP hosts initially route all signaling through the gatekeeper (the gatekeeper in effect proxies these messages). Once the call set up is complete, the media flows run directly between the VoIP hosts.

Though this architecture behaves well and the gatekeeper is usually able to make accurate call duration records (CDR's) in normal cases, it is not able to defend itself against failing terminals, attempted fraud (spoofing a call release without actually doing so) or even abusing the Real Time Data over IP network for other traffic not related to the Real Time Data over IP.

SUMMARY OF THE INVENTION

Accordingly, in a first aspect, the present invention provides a communications network including an originating Real Time Data over IP host and a terminating Real Time Data over IP host between which communication (e.g., "media flows") is to be effected, the network also including communication control means (e.g., a "gatekeeper") for at least receiving information relating to the communication, characterized in that the network also includes communication forwarding means (e.g., "a special gateway") which receives at least some data sent between the two Real Time Data over IP hosts and sends to the communication control means information relating to the communication (e.g., to the "signaling flows").

The term "media flows" generally relates to the data to be transmitted, e.g., user orientated data such as, in the case of a telephone call, the telephone call itself. The term "signaling flows" generally relates to the traffic concerning signaling that supports and/or controls the media flows.

In this way, the two Real Time Data over IP hosts do not send all data directly between each other and therefore control of the communication is improved. This may allow the network operator to, for example, reduce the possibility for fraud and/or improve the reliability of call-related information received. Preferably, substantially all of the signaling flows are received by the communication forwarding means and, preferably, also substantially all of the media flows are received by the communication forwarding means.

As mentioned above, any or all of the Real Time Date over IP hosts may be a native IP device (e.g., a H323/SIP terminal), a multimedia device (e.g., a PC with suitable equipment) and/or an ordinary telephone (connected, for example, via a media gateway).

Since Real Time Data is mentioned in the text, the invention applies to, e.g., multi-media sessions involving speech, audio, video, text, etc.

A Real Time Data over IP host can include any workstation, desktop computer, laptop computer, palmtop, wireless terminal, etc. equipped with audio/video devices and interfaces and running, e.g., a software client according to the H.323 or SIP standards. It might also be a telephone set with built in VoIP capabilities.

Although the above describes a Real Time Data over IP host to Real Time Data over IP host session, the invention applies also when only one IP host is in session with a regular telephone set connected to the Real Time Data over IP network through the PSTN and a PSTN/IP gateway.

In such a case, the PSTN/IP gateway may be considered to be one of the two Real time Data over IP hosts.

Preferably, at least part of the telecommunications network between the communication forwarding means and one of the Real Time Data over IP hosts is a Real Time Data over IP network, for example, a private network at least part of which is reserved substantially or wholly for the IP traffic. There may be a second communication forwarding means in which case the first communication forwarding means is associated with one of the originating Real Time Data over IP host or the terminating Real Time Data over IP host and the second communication forwarding means is associated with the other. In such an example, at least part or the entire network between the two communication forwarding means SGW may be the aforementioned private network.

In practical embodiments, there may be a plurality of communication forwarding means SGW in which case each of the Real Time Data over IP hosts is connected to a selected one or respective ones of the communication forwarding means. For example, each Real Time Data over IP host is connected to a respective nearest communication forwarding means.

Preferably, the communication forwarding means includes translation means for translating an external reference (for example a fixed IP address) of one or both of the hosts into an internal reference (e.g., a dynamic or temporary IP address). The internal reference may be one of a plurality of such internal references used within the network for directing communications during a communication session.

For example, the fixed IP address of the terminating Real Time Data over IP host may be translated into a dynamic IP address. It is then only this dynamic IP address which is given to the originating Real Time Data over IP host for the purposes of directing communication between the two hosts. The originating Real Time Data over IP host therefore does not know the true fixed IP address of the terminating Real Time Data over IP and this again helps to reduce the potential for fraudulent use of the network.

The or each communication forwarding means may also include tracking means for measuring values of one or more predefined parameters related to the communication. Such predefined parameters may be any or all of: details relating to the user (e.g., client identification and/or password), amount of data transferred, type of data transferred, duration of communication, time of communication, and other information useful for billing or monitoring use of the network. The communication forwarding means may include transmitting means for transmitting these values to a selected data receiver.

In a preferred embodiment, one or both of the Real Time Data over IP hosts includes message means for transmitting an "alive" message to the communication control means (either directly or indirectly via the communication forwarding means) in order to indicate that a communication session is in progress. The alive message may be transmitted at periodic intervals, for example once per second.

In a further aspect, the present invention provides any or all of a communication control means, a communication forwarding means and/or a Real Time Data over IP host for use in the network as described above.

In a further aspect, the present invention provides a method of controlling communication on a communications network, wherein the network includes an originating Real Time Data over IP host and a terminating Real Time Data over IP host between which communication is to be effected, the network also including communication control means for receiving information relating to the communication, characterized in that the method includes the steps of:

(i) transmitting at least some data from the originating Real Time Data over IP host to a communication forwarding means ("a special gateway");

(ii) using the communication forwarding means to direct communication between the Real Time Data over IP hosts; and (iii) sending information relating to the communication from the communication forwarding means to the communication control means.

Other preferred steps in the method will be apparent from the previous discussion of the features of the network itself.

BRIEF DESCRIPTION OF THE DRAWINGS

An embodiment of the present invention will now be described with reference to FIG. 1, which is a schematic diagram showing a composite telecommunications network illustrating various possible embodiments of a network according to the present invention.

BRIEF DESCRIPTION OF THE INVENTION

Figure 1:
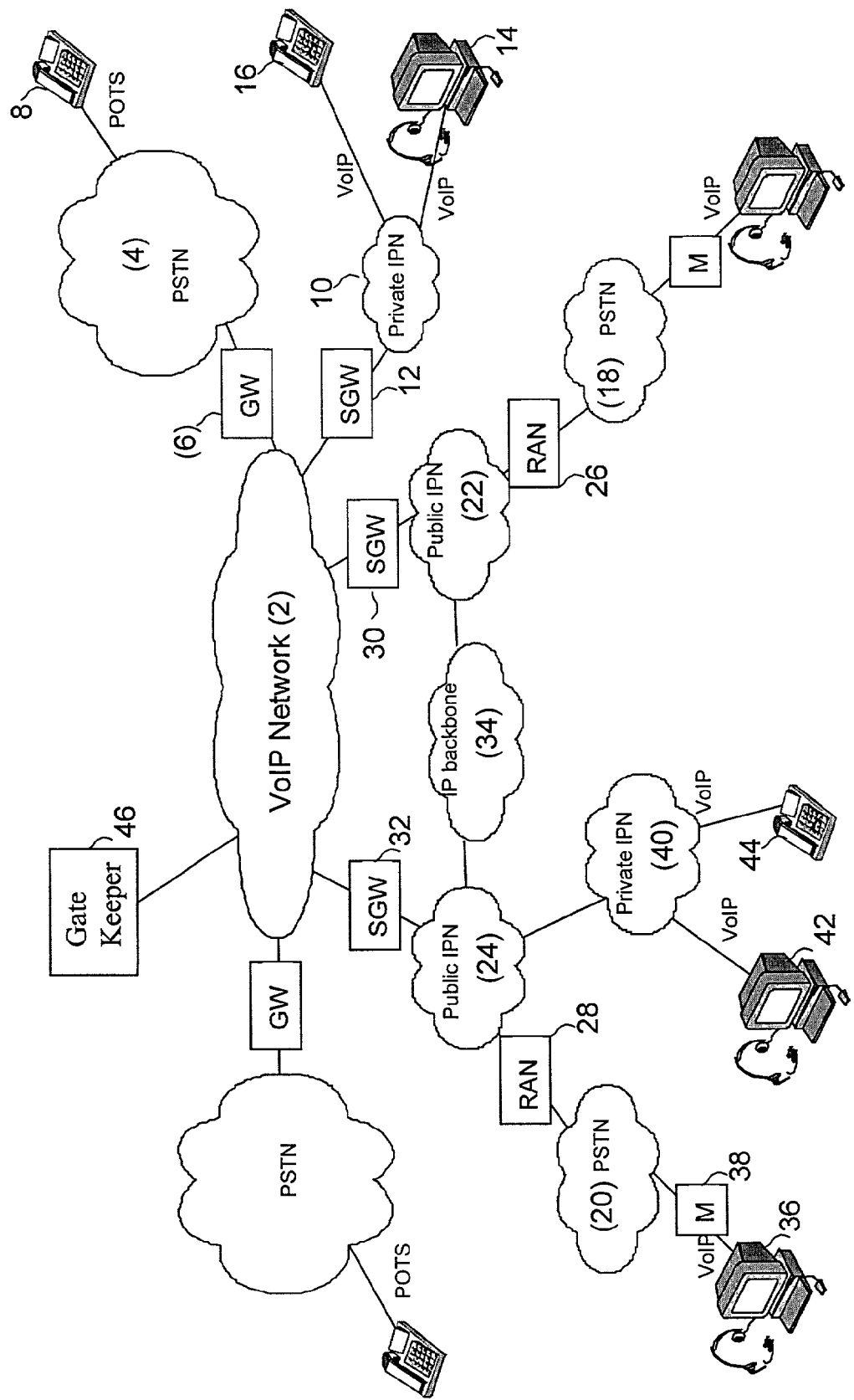

At the core of FIG. 1 is a VoIP network 2, which is used for communication between a number of other networks and devices. As mentioned in the introduction, the VoIP network 2 may typically be a private network and the owner or operator will wish to charge users for traffic carried on the network.

In this example, a number of other networks are connected to the VoIP network 2. For example, a public switched telephone network (PSTN) 4 is connected to the VoIP network 2 via a telephony 2 VoIP gateway 6. A number of telephones and/or other telephone networks may be connected to the PSTN 4 and these are illustrated by POTS device 8.

In addition a private IP based network 10 is connected to the VoIP network via a special gateway 12 in accordance with one aspect of the present invention. The private IP based network 10 is connected to various VoIP equipped devices such as PC 14 and telephone equipment 16.

In addition, two further PSTNs 18, 20 are each connected to a respective public IP based network 22, 24 via a respective remote access nodes 26, 28. In turn, each of the public IP based networks 22, 24 is connected to the VoIP via respective special gateways 30, 32. Also the two public IPNs 22, 24 are connected to each other via an IP backbone 34.

Devices such as a PC 36 may be connected to the PSTN 20 via a modem 38.

As a yet further example, an additional private IPN 40 supporting various VoIP devices 42, 44 may be connected to one of the public IPNNs, such as IPN 24.

As mentioned above, any or all of the various devices and/or separate networks may communicate with each other via the VoIP network 2. Traffic on the VoIP network 2 is controlled and/or monitored by a gatekeeper 46. By way of example, one communication session utilizing aspects of the present invention will now be described.

When an originating VoIP host (e.g., 14) wants to initiate a session it will not be directed to the terminating VoIP host (e.g., 12) directly (as in the prior art) but rather to the nearest available Special Gateway (12). The Special Gateway may or may not be a standalone device. If not it may be integrated as a function in the Media Gateway.

Before initiating a VoIP connection, the user may need to have a subscription with its VoIP provider. In return, he/she may have a software-package, including client-id and/or password. This package may contain the IP-address of the nearest Special Gateway (to be configured e.g., out of a list). With this software-package, any or all of the following may be included:

(a) Subscription of the user e.g., client-id and password;

(b) Suitable routing to a secure device (e.g., Special Gateway);

(c) Status information to be forwarded to the Call Server;

(d) Possible service options (e.g., a configured user-profile);

When starting a VoIP session, the Call Setup initiated by the VoIP host is routed via the Special Gatekeeper towards a Call Server of Gate Keeper (46).

At this point the Call Server Gateway may check the subscription of the VoIP host-user, e.g., looking at the client-id and password. If the user is not subscribed, or the subscription is terminated, the Call Setup may be terminated with a termination/cause indication sent to the VoIP host.

The Call Server usually has the user's profile. This profile may contain any or all of the following subscription information:

(a) Service subscriptions (e.g., activated supplementary services);

(b) Allowance subscriptions (e.g., allowance for transmitting/receiving data/video/etc.);

(c) Quality of Service subscriptions (delay, bandwidth etc).

Together with a secret dynamic (i.e. temporary) IP-address and the IP address of the nearest destination Special Gateway, the necessary information (e.g., Quality of Service, Allowances, etc) is routed to the originating Special Gateway (12). The secret IP-address is not forwarded to the originating VoIP host, but will replace the originating VoIP host's IP address, which resides in the voice-packets. This secret IP-address is only used between the originating and terminating Special Gateway (32). A connection is then setup between the originating Special Gateway (12) and the terminating Special Gateway (32) for example, the connection can be setup between Gateways, e.g., using an intra-gateway call-setup protocol (as available with H.323) or using an intra-call server protocol (ISUP+, etc.).

In turn, the terminating Special Gateway (32), will try to retrieve from its Call Server the required destination end-user information. If this terminating end-user does not have a subscription, the session may be terminated.

Thus, the terminating VoIP host is then contacted and the Call setup phase is concluded. From then on, the originating and terminating VoIP host can exchange media flows.

The media flow may be under control of one or both of the Special Gateways,(12, 32) as instructed by the Call Server. This may mean that any or all of the following apply:

(a) only the media-type is allowed for which the user has a subscription;

(b) the maximum bandwidth shall not be exceeded;

(c) IP-address for media-transfer is not known to the users;

(d) a "Keep-alive" message from the originating VoIP host is sent to inform the originating Special Gateway (and therefore also the Call Server) about the status of the session. If after a certain time-interval no keep-alive message is received by the Special Gateway, the session will be terminated and the Call Server will be informed.

Observing the signaling and media flows between VoIP hosts alone (as in the prior art) may not be enough for the VoIP network to know about the status of a session, and hence make accurate call duration records for subsequent billing. As mentioned previously, the network connection can be broken or a terminal can have failed. Preferably therefore, the VoIP host will be equipped with means, e.g., small client software, that will indicate its status to the gatekeeper with a small alive message (e.g., containing its ID and possibly a sequence number sent over a UDP packet) at time intervals of e.g., one second during the entire session.

Since the core of the VoIP network will most likely be built with IP routing devices, which will route any IP packet to the requested destination, fraud packets may be detected at the edges. As mentioned above, the special gateway will route the signaling flows to the gatekeeper and the media flows to the special gateway nearest to the destination VoIP host as instructed by the gatekeeper. It will also restrict the media flows (type, bandwidth) as instructed by the gatekeeper, e.g., if an audio session was requested and allowed a video session may not be. The existing special gateway will route signaling and media flow over the public/private IP based network to the destination VoIP host.

Thus, even if both VoIP hosts know each other's temporary IP addresses in the public/private IP-based network, they do not know the IP addresses used within the VoIP network, hence they cannot use it for other traffic. Moreover, the special gateway will effectively block data traffic other than that allowed (and paid for) within a VoIP session and of course the gatekeeper may instruct the special gateway to block any traffic between the two VoIP hosts after a session release signaling message. This helps reduce fraudulent use.

By means of the special gateway (SGW), correct billing information can be sent to the Call Server. The SGW controls the setup of the session towards the Call Server (signaling). All media-streams may pass the SGW and may be under control of the SGW. That means that the SGW is able to retrieve volume information for a specific media-stream coming from all users. As such, the SGW can inform the Call Server of the correct volume or billing information. The Call server may only send the bill information received from the SGW to the billing system. As such, one can guarantee the correct billing information.

Usually, a subscriber has to register with the service, to that effect, an ID may be created for him/her in the form of a name, alias or special telephone number (e.g., according to E.164) and stored in the database of the gatekeeper. In the case of an E.164 number, the subscriber may be reached through the normal PSTN when on line.

As mentioned, above the subscriber may then install a small software client on his/her VoIP host serving the purpose of sending the initial registry message and alive messages to the gatekeeper.

When a VoIP host gets on line with its public/private IP based network, the small client will attempt to make a connection with the gatekeeper, in order to notify it of the status (on line) of the VoIP host. This can be done automatically or manually. The (temporary) IP address is conveyed within this message, hence the gatekeeper will associate it with the IP of the subscriber as long as the on line status is valid. This message will reach the gatekeeper through the nearest special gateway informing the gatekeeper of the (temporary) geographical location of the VoIP host. This means that the subscriber can be reached wherever he/she is connected. When the on line status is acknowledged by the gatekeeper the VoIP host becomes reachable for multimedia sessions.

The VoIP network is preferably logically separated from other IP networks but this not mean the same switching, routing and transmission means cannot be used, as long as the VoIP traffic will run independently of the other traffic.

The above embodiment is given by way of example only and variations will be apparent to those skilled in the art.

The invention claimed is:

1. A communications network comprising:
   an originating Real Time Data over IP host;
   a terminating Real Time Data over IP host;
   communication control means for at least receiving information relating to a communication;
   a first communication forwarding means that replaces a fixed IP address in a data packet sent from the terminating Real Time Data over IP host to the originating Real Time Data over IP host with a first dynamic IP address to conceal the fixed IP address of the terminating Real Time Data over IP host, wherein the fixed IP address of the originating Real Time Data over IP host is unknown to the first communication forwarding means; and
   a second communication forwarding means that replaces a fixed IP address in a data packet from the originating Real Time Data over IP host to the terminating Real Time Data over IP host with a second dynamic IP address to conceal the fixed IP address of the originating Real Time Data over IP host, wherein the fixed IP address of the terminating Real Time Data over IP host is unknown to the second communication forwarding means,
   wherein, during the setup of a communication session between the originating Real Time Data over IP host and the terminating Real Time Data over IP host, the communication control means exchanges only the dynamic IP addresses between the first and second communications forwarding means.

2. The network according to claim 1, wherein at least part of the network between one of the communication forwarding means and one of the Real Time Data over IP hosts is a Real Time Data over IP network.

3. The network according to claim 2, further comprising a plurality of communication forwarding means, wherein each of the Real Time Data over IP hosts is connected to a selected one of the communication forwarding means.

4. The network according to claim 1, wherein at least one of the communication forwarding means comprises a translation means that translates an external reference of one or both of the hosts into an internal reference.

5. The network according to claim 1, wherein at least one of the communication forwarding means further comprises tracking means for measuring at least one predefined parameter related to the communication and the communication forwarding means comprises transmitting means for transmitting the measured value to a selected data receiver.

6. The network according to claim 1, wherein at least one of the Real Time Data over IP hosts comprises message means for transmitting a message to the communication control means to indicate that a communication session is in progress.

7. A method of controlling communication on a communications network comprising an originating Real Time Data over IP host and a terminating Real Time Data over IP host between which communication is to be effected and a communication control means for receiving information relating to the communication, wherein the method comprises:
   transmitting at least some data from the originating Real Time Data over IP host to a first communication forwarding means, wherein the first communication forwarding means replaces a fixed IP address in a data packet sent from the originating Real Time Data over IP host to the terminating Real Time Data over IP host with a first dynamic IP address to conceal the fixed IP address of the originating Real Time Data over IP host, and wherein the fixed IP address of the terminating Real Time Data over IP host is unknown to the first communication forwarding means;
   transmitting at least some data from the terminating Real Time Data over IP host to a second communication forwarding means, wherein the second communication forwarding means replaces a fixed IP address in a data packet sent from the terminating Real Time Data over IP host to the originating Real Time Data over IP host with a second dynamic IP address to conceal the fixed IP address of the terminating Real Time Data over IP host, and wherein the fixed IP address of the originating Real Time Data over IP host is unknown to the second communication forwarding means;
   using the communication forwarding means to direct communication between the Real Time Data over IP hosts; and
   sending information relating to the communication from the communication forwarding means to the communication control means,
   wherein, during the setup of a communication session between the originating Real Time Data over IP host and the terminating Real Time Data over IP host, the communication control means exchanges only the dynamic IP addresses between the first and second communications forwarding means.

8. A communications network comprising:
an originating Real Time Data over IP host;
a terminating Real Time Data over IP host;
a communications controller for at least receiving information relating to a communication;
a first gateway that replaces a fixed IP address in a data packet sent from the terminating Real Time Data over IP host to the originating Real Time Data over IP host with a first dynamic IP address to conceal the fixed IP address of the terminating Real Time Data over IP host, wherein the fixed IP address of the originating Real Time Data over IP host is unknown to the first gateway; and
a second gateway that replaces a fixed IP address in a data packet from the originating Real Time Data to the terminating Real Time Data over IP host with a second dynamic IP address to conceal a fixed IP address of the originating Real Time Data over IP host, wherein the fixed IP address of the terminating Real Time Data over IP host is unknown to the second gateway,
wherein, during the setup of a communication session between the originating Real Time Data over IP host and the terminating Real Time Data over IP host, the communication controller exchanges only the dynamic IP addresses between the first and second gateways.

9. The network according to claim 8, wherein at least part of the network between one of the gateways and one of the Real Time Data over IP hosts is a Real Time Data over IP network.

10. The network according to claim 9, further comprising a plurality of gateways, wherein each of the Real Time Data over IP hosts is connected to a selected one of the gateways.

11. The network according to claim 8, wherein at least one of the gateways comprises a translator that translates an external reference of one or both of the hosts into an internal reference.

12. The network according to claim 8, wherein at least one of the gateways further comprises a tracker for measuring at least one predefined parameter related to the communication and the gateway comprises a transmitter for transmitting the measured value to a selected data receiver.

13. The network according to claim 8, wherein at least one of the Real Time Data over IP hosts comprises a message transmitter for transmitting a message to the communications controller to indicate that a communication session is in progress.

14. The network according to claim 1, wherein the first and second communication forwarding means each comprise a translation means for translating a fixed IP address of a Real Time Data over IP host into a dynamic IP address.

15. The network according to claim 8, wherein the first and second gateways each comprise a translator for translating a fixed IP address of a Real Time Data over IP host into a dynamic IP address.

* * * * *